United States Patent
Rao et al.

(10) Patent No.: US 8,160,004 B2
(45) Date of Patent: Apr. 17, 2012

(54) METHOD FOR OPTIMIZING SPATIAL DIVERSITY GAIN OF A SET OF NODES USED FOR COOPERATIVE SENSING

(75) Inventors: Yadunandana N. Rao, Sunrise, FL (US); Apoorv Chaudhri, Cambridge, MA (US); Surhir Rao, Secunderabad (IN)

(73) Assignee: Motorola Solutions, Inc., Schaumburg, IL (US)

( * ) Notice: Subject to any disclaimer, the term of this patent is extended or adjusted under 35 U.S.C. 154(b) by 400 days.

(21) Appl. No.: 12/494,742

(22) Filed: Jun. 30, 2009

(65) Prior Publication Data
US 2010/0329180 A1 Dec. 30, 2010

(51) Int. Cl.
*H04W 4/00* (2009.01)
*H04W 72/00* (2009.01)
*G06F 15/177* (2006.01)
*G06F 15/173* (2006.01)
*H04B 7/02* (2006.01)

(52) U.S. Cl. ........ 370/328; 370/237; 370/330; 370/342; 370/352; 709/200; 709/220; 709/224; 455/450; 455/452.1; 455/509; 455/512; 455/67.11; 455/101

(58) Field of Classification Search .......... 370/328–463; 709/200–224
See application file for complete search history.

(56) References Cited

U.S. PATENT DOCUMENTS

| | | | | |
|---|---|---|---|---|
| 6,735,630 B1 * | 5/2004 | Gelvin et al. | ................. | 709/224 |
| 6,826,607 B1 * | 11/2004 | Gelvin et al. | ................. | 709/224 |
| 6,832,251 B1 * | 12/2004 | Gelvin et al. | ................. | 709/224 |
| 6,859,831 B1 * | 2/2005 | Gelvin et al. | ................. | 709/224 |
| 7,020,701 B1 * | 3/2006 | Gelvin et al. | ................. | 709/224 |
| 7,610,036 B2 * | 10/2009 | Teo et al. | ................. | 455/403 |
| 7,627,056 B1 * | 12/2009 | Harris et al. | ................. | 375/296 |
| 7,688,846 B2 * | 3/2010 | Calcev et al. | ................. | 370/445 |
| 7,742,764 B2 * | 6/2010 | Gillig et al. | ................. | 455/434 |
| 7,797,367 B1 * | 9/2010 | Gelvin et al. | ................. | 709/200 |
| 7,844,687 B1 * | 11/2010 | Gelvin et al. | ................. | 709/220 |
| 7,885,229 B2 * | 2/2011 | Huttunen et al. | ............. | 370/329 |
| 7,904,902 B2 * | 3/2011 | Hilt et al. | ................. | 717/178 |
| 7,949,357 B2 * | 5/2011 | Huttunen et al. | ............. | 455/509 |
| 7,956,807 B1 * | 6/2011 | Celebi et al. | ................. | 342/450 |
| 7,965,641 B2 * | 6/2011 | Ben Letaief et al. | ......... | 370/237 |
| 8,004,995 B2 * | 8/2011 | Hyon et al. | ................. | 370/241 |

(Continued)

FOREIGN PATENT DOCUMENTS
EP 2228932 A1 * 9/2010

*Primary Examiner* — Phirin Sam
*Assistant Examiner* — Venkatesh Haliyur
(74) *Attorney, Agent, or Firm* — Barbara R. Doutre (57) ABSTRACT

A group of nodes used for sensing in a cooperative sensing communication system (100) are selected from nodes (104-112) associated with a base station (102) operating in secondary communication mode. The group has a spatial diversity gain, as determined by a cooperative sensing index (306) that initially meets a minimum threshold. To optimize the spatial diversity gain, nodes not in the initial set are individually added to the set (408), and the index is recomputed (608). The additional node having the highest effect on spatial diversity is added to the group (614). To maintain group size, each of the original nodes is individually removed from the group (706) and the index is recomputed (708) with each initial node removed to determine which of the initial nodes provided the smallest spatial gain contribution, and is removed from the group (714).

13 Claims, 7 Drawing Sheets

U.S. PATENT DOCUMENTS

| | | |
|---|---|---|
| 8,014,337 B2 * 9/2011 | Rao et al. | 370/319 |
| 2008/0160927 A1 * 7/2008 | Bar-Ness et al. | 455/73 |
| 2008/0165754 A1 * 7/2008 | Hu | 370/342 |
| 2008/0165880 A1 * 7/2008 | Hyon et al. | 375/267 |
| 2008/0166974 A1 * 7/2008 | Teo et al. | 455/67.11 |
| 2008/0233991 A1 * 9/2008 | Gillig et al. | 455/519 |
| 2008/0261639 A1 * 10/2008 | Sun et al. | 455/515 |
| 2008/0268892 A1 * 10/2008 | Hamdi et al. | 455/522 |
| 2008/0293353 A1 * 11/2008 | Mody et al. | 455/1 |
| 2008/0304404 A1 * 12/2008 | Lu et al. | 370/210 |
| 2008/0305755 A1 * 12/2008 | Subramani et al. | 455/120 |
| 2009/0060001 A1 * 3/2009 | Waltho | 375/133 |
| 2009/0102981 A1 * 4/2009 | Mody | 348/732 |
| 2009/0109990 A1 * 4/2009 | Calcev et al. | 370/445 |
| 2009/0111388 A1 * 4/2009 | Chen | 455/70 |
| 2009/0124207 A1 * 5/2009 | Mody et al. | 455/67.11 |
| 2009/0124208 A1 * 5/2009 | Mody et al. | 455/67.11 |
| 2009/0180492 A1 * 7/2009 | Hu | 370/462 |
| 2009/0207735 A1 * 8/2009 | Ben Letaief et al. | 370/237 |
| 2009/0221295 A1 * 9/2009 | Sahin et al. | 455/450 |
| 2009/0247201 A1 * 10/2009 | Ye et al. | 455/509 |
| 2009/0316568 A1 * 12/2009 | Harris et al. | 370/203 |
| 2009/0325482 A1 * 12/2009 | Zhou et al. | 455/25 |
| 2010/0003922 A1 * 1/2010 | Zhou et al. | 455/67.11 |
| 2010/0062718 A1 * 3/2010 | Zhou et al. | 455/67.11 |
| 2010/0069013 A1 * 3/2010 | Chaudhri et al. | 455/67.11 |
| 2010/0103924 A1 * 4/2010 | Rao et al. | 370/351 |
| 2010/0137014 A1 * 6/2010 | Rao et al. | 455/512 |
| 2010/0220707 A1 * 9/2010 | Teo et al. | 370/343 |
| 2010/0248769 A1 * 9/2010 | Li et al. | 455/509 |
| 2010/0266002 A1 * 10/2010 | Du et al. | 375/224 |
| 2010/0279725 A1 * 11/2010 | Muraoka et al. | 455/509 |
| 2010/0329180 A1 * 12/2010 | Rao et al. | 370/328 |
| 2011/0065471 A1 * 3/2011 | Selen et al. | 455/509 |
| 2011/0076959 A1 * 3/2011 | Selen et al. | 455/67.11 |
| 2011/0098005 A1 * 4/2011 | Selen et al. | 455/67.11 |
| 2011/0170424 A1 * 7/2011 | Safavi | 370/242 |
| 2011/0199965 A1 * 8/2011 | Ariyoshi et al. | 370/328 |

* cited by examiner

METHOD FOR OPTIMIZING SPATIAL DIVERSITY GAIN OF A SET OF NODES USED FOR COOPERATIVE SENSING

FIELD OF THE INVENTION

The invention relates generally to wireless communication, and more particularly to the identification of a set of nodes to be used for spectrum sensing to identify available channels for secondary communication, and to increasing the spatial diversity among the selected nodes to provide better sensing results.

BACKGROUND OF THE INVENTION

With ever increasing demand for communication services, and the crowding of conventionally assigned spectrum, governments are allowing unlicensed communication operation in licensed, but under-utilized spectrum bands. One example of this is the recent Federal Communications Commission's decision to allow radio communication systems to use channels in the spectrum region designated for licensed television broadcast. In a given geographic region, there will typically be a number of television channels which are not presently being utilized for television or wireless microphone transmission. These unused wideband 6 MHz channels may be made available for broadband, wideband or narrowband radio communication which may be 12.5 KHz to 150 KHz wide. Accordingly, there is a need to identify spectrum segments or channels conventionally licensed or utilized for one form of communication that may be used for other, secondary communication activity.

To determine the availability of a given channel or channels, a secondary communication system will task a number of nodes associated with the system to sense the channels, and report the results. The sensing results allow the communication system to determine whether the sensed channel(s) are available for secondary communication, or if the communication should search elsewhere for available channels. To assure the secondary communication activity will not interfere with primary communication operators, the set of nodes tasked with sensing the channel(s) should be geographically or spatially diverse within the coverage area of the secondary communication system. Many modern communication devices are equipped with satellite positioning receivers and are able to determine and report their own location. Knowing the locations of nodes in the system makes selecting nodes to provide adequate geographic diversity relatively easy, but in systems where there is no node location information available, such as when the nodes do not have a self location determination means, selecting nodes that have adequate geographic diversity becomes challenging. Therefore, there is a need to select a set of nodes having a desired level of geographic diversity to assure adequate sensing results when searching for an available channel in a secondary communication system.

SUMMARY OF THE INVENTION

The invention is embodied in one embodiment as a method for optimizing spatial diversity of a set of nodes for cooperative spectrum sensing, such as for use in a secondary communication system. The method may commence by selecting an initial set of nodes from a plurality of nodes associated with a bases station. The initial set of nodes is selected substantially at random from the plurality of nodes. Once the initial set of nodes is selected, the method commences by obtaining sensing results from each node of the initial set of nodes. The sensing results are produced by the nodes in response to performing a cooperative sensing regime, as instructed by the base station. The base station, of other system equipment then determines an initial cooperative sensing index of the initial set of nodes based on the sensing results. The initial cooperative sensing index indicates a level of spatial diversity of the initial set of nodes. The initial cooperative sensing index must satisfy a minimum spatial diversity criteria. The base station then selects at least one additional node from the remaining nodes. The remaining nodes are nodes that are not in the initial set of nodes. The additional nodes are selected substantially at random from the remaining nodes. The base station then commences replacing at least one node in the initial set of nodes with the at least one additional node to produce an optimized set of nodes. The optimized set of nodes then has an increased cooperative sensing index that is higher than the initial cooperative sensing index.

The invention may alternatively be embodied as a method for optimizing a sensing set of nodes for use in cooperative sensing secondary channel availability. This alternative embodiment commences by selecting an initial set of nodes from a plurality of nodes associated with a base station to form a sensing set of nodes. The initial set of nodes has a cooperative sensing index that at least meets a minimum cooperative sensing index criteria. The method then commences by selecting an additional set of nodes, which are one or more nodes from the plurality of nodes not in the initial set of nodes. The base station then determines a cooperative sensing index delta for each one of the additional nodes when each of the additional nodes is individually added to the sensing set of nodes. From these additional nodes a leader node is identified which yields the highest cooperative sensing index delta when added to the sensing set. The leader node is then added to the sensing set of nodes. The method proceeds by determining a cooperative sensing index delta for each node of the initial set of nodes when individually removed from the sensing set of nodes with the leader node added to the sensing set. The node yielding the lowest cooperative sensing index delta is identified and removed from the sensing set.

The invention may be alternatively embodied as a secondary communication system made of a plurality of nodes and a base station. The base station is configured to provide a radio interface to each of the plurality of nodes, and is further configured to define a set of sensing nodes from the plurality of nodes by receiving sensing results of performing a sensing regime from an initial set of nodes having an initial cooperative sensing index. The bases station is further configured to replace nodes in the initial set of nodes with other nodes from the plurality of nodes. The nodes used to replace initially selected nodes are found to increase the cooperative sensing index of the set over nodes of the initial set. Nodes of the initial set having a low effect on the cooperative sensing index are removed.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention uses a cooperative sensing index (CSI), derived from a mathematical operation on the sensing results provided by subscriber nodes, to select a group of nodes for sensing candidate channels. The mathematical operation indicates the amount of randomness of the sensing results. Sensing results that are highly dependent, meaning the sensing results are similar among two or more nodes, tend to indicate a low spatial diversity among the nodes. A low dependency of sensing results among the nodes, meaning a substantial variation in the sensing results among the nodes, indicates a higher degree of spatial diversity. The goal is to find a set of nodes with a sufficient level of spatial diversity, as indicated by their cooperative sensing index, such that when the set of nodes is used to sense ambient channel conditions of candidate channels for secondary communication, there is a sufficient probability of detection of any incumbent signals in the candidate channel, thus increasing the probability of detection and reducing the false alarm rate. The invention further enhances the spatial diversity and cooperative sensing index of the sensing set of nodes by selecting additional nodes, and determining each additional node's effect on the cooperative sensing index of the set. Additional nodes that have a beneficial effect on cooperative sensing index, meaning they tend to increase the spatial diversity of the set of nodes, may be used to replace nodes of the initial set that have little effect on the cooperative sensing index as nodes that have little effect on the CSI will tend to be situated near other nodes.

Figure 1:
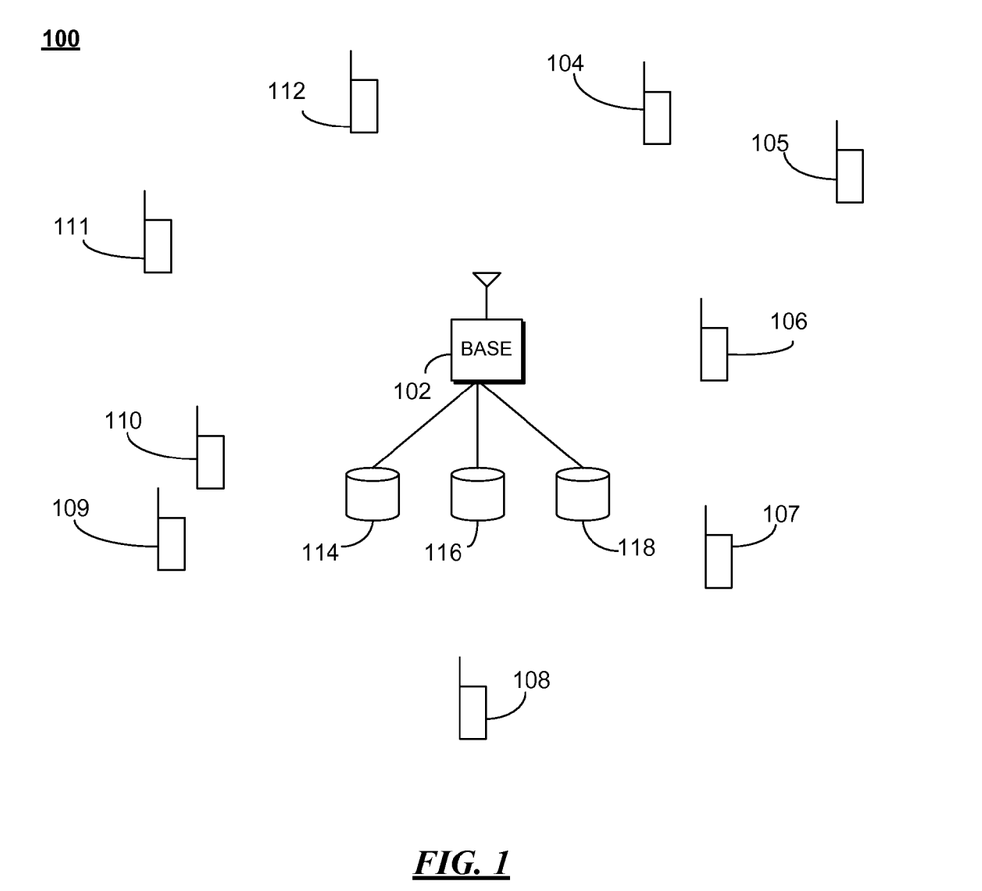
FIG. 1 shows a communication system diagram of a secondary communication system deployment, including a base station and subscriber nodes associated with the base station.

Referring to FIG. 1, there is shown a communication system diagram of a secondary communication system deployment 100, including a base station 102 and subscriber nodes 104-112 associated with the base station. The subscriber nodes may be cognitive radios which can adapt to the ambient radio environment. The base station provides a radio interface to the subscriber nodes, or simply, nodes, in the vicinity of the base station. The nodes and base station communicate by radio links on established channels in accordance with a protocol defined by the radio interface. The communication system may have channels for primary communication operation, meaning a spectrum portion or channels reserved for exclusive use by the communication system, as is the case with communication systems such as public safety communication systems. The base station is coupled to other communication equipment via network links, as is well known.

To increase system capacity, the communication system may operate in a secondary mode, using unused channels or spectrum in a spectrum region that may be otherwise generally reserved for other systems. For example, in many regions, even in congested metropolitan regions, there are typically unused television channels in the spectrum reserved for commercial television broadcasting. Ordinarily, use of these unused channels would be prohibited, but governmental authorities are allowing use of such unused channels provided the secondary operator take precautions to assure their communication activity will not interfere with primary operators or reception of primary operator transmissions. In order to prevent undesired interference with primary operators the base station may have several nodes perform sensing regimes and report the results back to the base station. The sensing regime indicates one or more frequencies or channels to sense, making measurements of such radio parameters of received signal strength of any incumbent signals, group delay, and so on.

Parameters of the sensing regime may be provided by various information sources, including a geo-location database 114, a terrain database 116, and a policy database 118. The geo-location database indicates occupied channel in the general region around the location of the base station, which indicates potential unused candidate channels that may be used for secondary communication activity. The terrain database indicates parameters relating to the general terrain of the region in which the base station is located. The base station generally knows its own location, and provides its location when querying the geo-location and terrain databases. A response to the base stations query is then prepared in view of the base station's location. The policy database may indicate, for example, threshold levels to be used in sensing, what radio parameters are to be sensed, threshold levels for spatial diversity performance, and so on. The databases 114-118 may be hosted at servers located remotely from the base station, or they may be accessible more locally to the base station. The information provided by the databases is used to determining a sensing regime for the nodes to perform, both when sensing candidate channels and when sensing for determining the spatial diversity of the nodes.

The results of the sensing regime may be reported as "hard" or "soft" results, where hard results merely indicate whether the sensed channel passed or failed some selected threshold, and soft results indicate actual measurement values and might include additional measurement statistics. Furthermore, the nodes selected to perform the sensing should have a minimum level of geographic or spatial diversity. That is, they should be selected to obtain sensing results that are reasonably representative of the coverage area of the communication system. Generally, selecting nodes that are substantially co-located should be avoided because they provide essentially duplicative results. For example, nodes 109 and 110 should not both be selected to perform the same sensing regime as they are located relatively close to each other, and would therefore provide no spatial diversity.

In systems where the locations of nodes are known by the base station, nodes can be selected based on their known geographic location to achieve the desired spatial diversity. But in systems where the locations of nodes are not known, a different method of selecting nodes must be used. The difference of sensing results among nodes can be exploited to infer spatial diversity.

Figure 2:
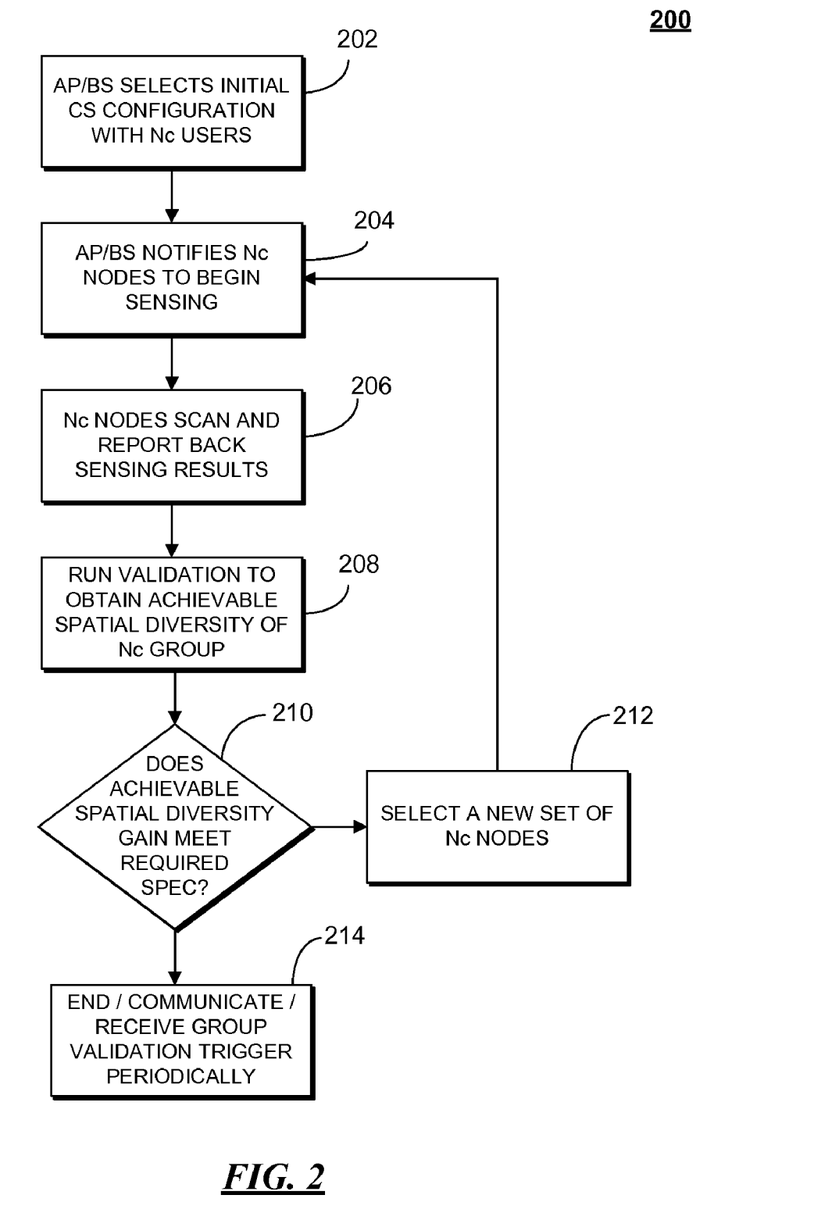
FIG. 2 shows an example of the cooperative sensing technique in accordance with an embodiment of the invention.

FIG. 2 illustrates an example of the cooperative sensing technique 200 in accordance with an embodiment of the invention. Referring to the Cognitive Radio network 100 of FIG. 1 in conjunction with the sensing technique of FIG. 2, base station (BS) 102 begins at step 202 by selecting an initial cooperative sensing (CS) group with Nc users from the nodes associated with the base station. The Nc users selected by the BS are notified to begin sensing regime and report X measurements of hard/soft information at step 204. The sensing regime configuration may include the channels or frequencies to sense, type of sensing method and type of sensing feedback as well as known and unknown transmitters. The goal of obtaining sensing results from the CR nodes is to estimate the achievable spatial diversity of a given group of nodes. The fact that spatial diversity is independent of the transmitter locations, it is possible to utilize known sources (transmitters) for sensing, such as known TV stations, cell towers, etc. The X measurements are taken over a period of time. The same type of measurements will be requested by the BS, so there are X measurements of same type from each user. All the Nc users scan the channel and report back sensed data in the form of hard decisions/soft information to the BS at 206. A hard decision is 1/0 binary decision specifying whether activity is detected or not detected on a channel. Soft information for a channel can be signal-to-noise ratio (SNR) values, received signal strength indicator (RSSI), correlation data to name a few.

Figure 3:
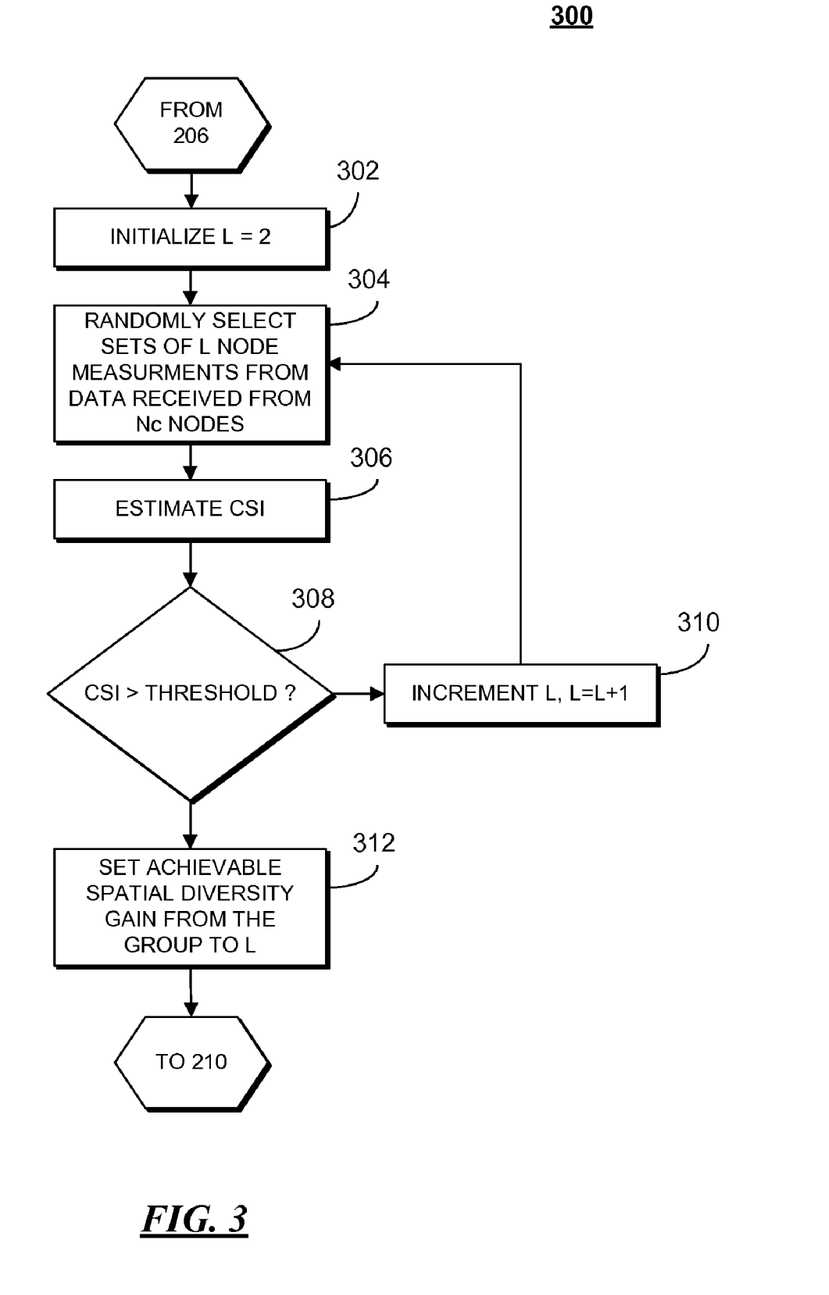
FIG. 3 shows an embodiment of the validating and combining portion of the cooperative sensing technique of FIG. 2.

Upon receipt of the sensing results (hard/soft information) from Nc users, the base station 206 runs a validation algorithm to validate the spatial diversity of the user group based on sensing data at step 208, as will be elaborated in FIG. 3. Briefly, validation 208 compares cooperative sensing index (CSI) metrics to threshold(s) to identify the achievable spatial diversity gain of the Nc group of CRs, wherein the CSI metric is calculated using sensing data collected from the CRs in the Nc group. Thus validation step 208 results in an achievable spatial diversity gain of the Nc group of subscribers.

Once the validation step 208 is complete, the technique moves to step 210 where the base station 102 checks if the achievable spatial diversity gain of the group of Nc subscribers meets a required spatial diversity gain or not. The required spatial diversity gain for system 100 is a function of the desired probability of detection (at a known false alarm rate) and may be specified within the databases, 114, 116 or 118 or specified by an external source, such as a system engineer and as such will be considered a predetermined spatial diversity gain. If the predetermined spatial diversity gain is not met at 210, then another group of users is selected at 212, and the technique returns to step 204 to notify and begin cooperative sensing again using the new group of users. If the predetermined spatial diversity gain is met at 210, the validated group can start spectrum sensing at 214 to identify a vacant/suitable channel for operation. Periodic triggers can be used to ensure that the group remains validated or gets updated. Maintaining diversity of the CRs participating in cooperative sensing in order to reliably detect primary incumbents as provided by method 200 allows a secondary system 100 to communicate over a channel typically dedicated to the primary system without interfering with the primary system.

Referring to FIG. 3, the validation method 208 is described in more detail in accordance with an embodiment. Validation 208 is performed by the base station 102. Since the minimum number of nodes needed for cooperation is at least 2, an initial value of L=2 is chosen. Thus, two nodes are randomly selected from Nc users at 302.

The base station then selects sets of sensing measurements from the randomly chosen L nodes out of Nc nodes at step 304. Note, as shown in equation (1), that there will be:

$$\binom{N_c}{L} = \frac{N_c!}{(N_c - L)!L!} \quad (1)$$

sets of L nodes out of a set of Nc nodes.

The base station 102 estimates the Cooperative Sensing Index (CSI) using the measurements taken by the randomly selected L nodes. CSI is based on the statistical Entropy metric which is a measure of the uncertainty or randomness. For the sake of clarity, (not a limitation of the invention), assume that the sensing information from every node is a hard decision (activity detected (1) or not (0)). The CSI for a given L is defined by equation (2) as:

$$CSI(L) = \frac{H(U)}{L}, \quad H(U) = -\sum_{j=1}^{2^L} p_j \log_2(p_j) \quad (2)$$

where H(U) is the Shannon Entropy for a discrete random variable U that takes on $2^L$ values each with probability $p_j$. These probabilities are estimated based on the sensing measurements taken from the sets of randomly chosen L nodes. Since the CSI is a function of entropy, it measures the randomness in the measurements which is proportional to the spatial diversity gain. If the CSI for a given L exceeds a threshold as will be described later, then the selected group of Nc users are capable of providing a diversity gain of L.

The CSI is normalized between 0 and 1 and monotonically decreases with increases in the number of correlated or dependent observations within the chosen set of nodes. As mentioned earlier, correlated nodes reduce the cooperative sensing gain and as such should be avoided.

For a given group of nodes, the CSI is used to estimate the achievable spatial diversity gain by computing the CSI for increasing values of L. The value of L at which the CSI falls below a predetermined threshold is termed as achievable diversity gain.

The CSI for randomly chosen L nodes is estimated on the selected measurements at step 306 and compared to one or more CSI thresholds at step 308. The CSI threshold could be one or many different thresholds depending on the type of measurements that are used to calculate the CSI metric being considered. If the CSI estimate metric exceeds the CSI threshold at 308, then the achievable spatial diversity gain is considered to be higher than L, and the achievable spatial diversity gain is incremented as L=L+1 at 410. The CSI metric is then re-estimated at 306 using sets of sensing measurements from randomly chosen L+1 nodes out of Nc nodes. The process is repeated until the CSI falls below the threshold(s). That is, as L is increased, the achievable spatial diversity tends to decrease. The value of L when the CSI metric falls below the threshold will be the achievable spatial diversity gain at 312, which gets compared to the specification at 210.

In accordance with further embodiments, there may arise situations where there might not be any known TV stations or cellular towers operating within the CR network. In such cases, the CR devices will perform both group validation as well as primary user sensing simultaneously. In other words, if there are no reference signals that can be sensed for validation then sensing for the primary signal itself is performed for validation (estimation of CSI etc.) and use cooperative sensing within the group to make a decision on whether a primary user is present or not.

Figure 4:
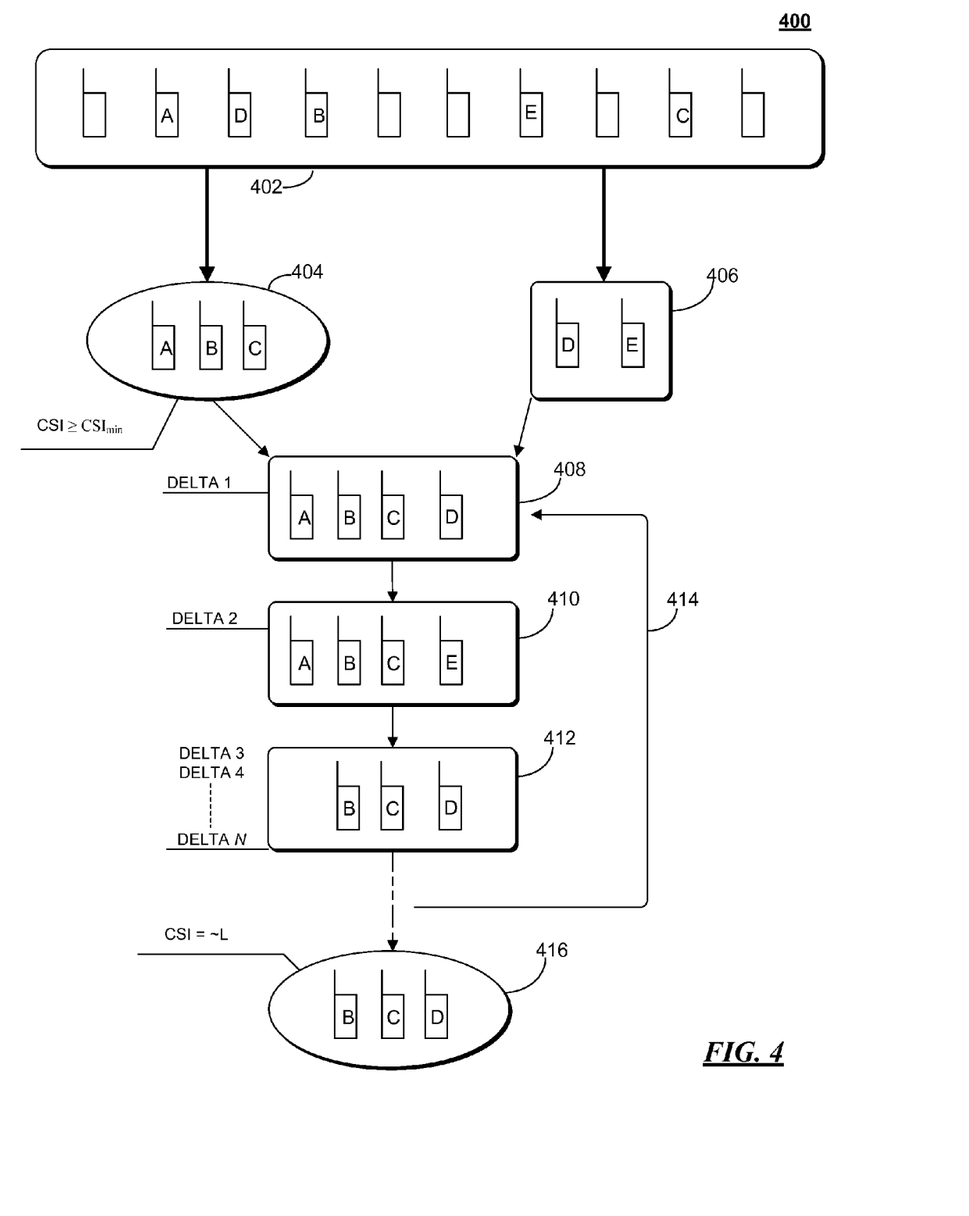
FIG. 4 shows a flow diagram of a method of selecting a sensing set of nodes in a wireless secondary communication system, in accordance with an embodiment of the invention.

FIG. 4 illustrates a flow diagram 400 of a method of selecting a sensing set of nodes in a wireless secondary communication system, in accordance with an embodiment of the invention. The plurality of nodes 402 is associated with a base station such as base station 102. A relatively small number of nodes are shown here in the plurality of nodes, which in actual practice may number in the hundreds in some systems. As shown here, for purposes of example, the plurality of nodes includes nodes labeled A-E. The nodes are randomly located in the coverage area of the base station and the base station has no information regarding their locations.

An initial set of nodes 404 is selected. The number of nodes may be set based on the desired spatial diversity, and measured by determining a CSI for all nodes or a significantly large number of nodes. The initial set of nodes has a CSI which is greater than a minimum CSI threshold $CSI_{min}$. The selection of the initial nodes may have to be repeated in order to find a set of nodes which yields a CSI that satisfies this minimum spatial diversity criterion. The set is merely an identification of member nodes at the base station, or some other processing agent. In practice, all or a large number of nodes of the plurality of nodes 402 may provide sensing results upon performing the sensing regime. These results may be recorded at the base station (or equivalent). The process of selecting the set of nodes may then simply be retrieving the sensing results of a given selection of nodes and determining their CSI. If a first set of nodes' sensing results do not produce a sufficient initial CSI, then another group of results may be selected. As used here, terminology such as, for example, "selecting a set of nodes" simply means identifying the nodes out of the record of nodes associated with the base station, and their sensing results.

Upon selection of the initial set of nodes an additional set of nodes 406 is selected. The additional set has at least one node in it. The additional nodes are selected from the plurality of nodes 402 and are not part of the initial set of nodes, but are selected from the remaining nodes of 402. The initial set 404 has a CSI that meets a minimum threshold, but is below an optimum or desired level. The goal is to obtain a set of nodes to be used for candidate channel sensing that has a CSI near the desired level, without exceeding a desired number of nodes for the sensing set. To improve the CSI of the initially selected set, one node from the additional nodes 406 is selected. Alternatively, any node in the plurality of nodes not in the initial set may be selected. Generally, as with the initial set of nodes, the additional nodes may be randomly selected. The method then begins an iterative process. One by one, each additional node is added in with the initial nodes to determine a new CSI, as indicated by boxes 408 and 410. The new CSI will be incrementally higher than the CSI of the initial set, indicated by "DELTA 1" and "DELTA 2." These CSI deltas may be different depending on the variation of their respective sensing results from those of the nodes in the initial set. Once the CSI delta for each additional node is determined, the additional node producing the highest CSI delta may be identified and designated as a leader node. The leader node may then be added to the set of initial nodes. Next, to maintain the number of nodes in the sensing set, the method seeks to eliminate one of the initial nodes, effectively replacing it with the leader node for the sensing set of nodes. In box 412, each initial node from 404 is removed while the leader node is still included, and a CSI delta is obtained when each initial node is removed from the sensing set. Once all initial nodes have been individually removed and their CSI delta determined, the initial node having the lowest CSI delta can be identified. The initial node having the lowest CSI delta is then replaced by the leader node, producing an optimized set of nodes, with an optimized CSI.

In the present example, node D is found to be the leader node, with DELTA 1 being higher than DELTA 2. Accordingly, node D is added in box 412, while each of the initial nodes are individually removed and their respective CSI contributions are determined (DELTA 3, DELTA 4 . . . DELTA N). Once the initial node having the lowest contribution is replaced with the additional node having the highest CSI contribution, if the CSI is still substantially below the desired CSI level, the process may be iteratively repeated, and indicated by arrow 414, whereupon the optimized set becomes the initial set. If the CSI is substantially close to the desired CSI level, then the process may end with set 416. In the present example, node D replaced node A. It will be appreciated by those skilled in the art that variation of the method may be used, such as adding two, or more additional nodes and replacing two or more nodes at a time. Generally this would be less efficient, though, then determining each nodes CSI contribution individually in a given set of nodes. Furthermore, it will be appreciated that, for example, if node D produces a CSI delta of d, and node E produces a CSI delta of e, adding both nodes D and E will not increase the CSI by d+e as nodes D and E may be highly correlated. Therefore determining each node's CSI delta individually is more efficient. In the above method, it is assumed that each node is substantially fixed. That may be determined, for example, if the nodes are known to be fixed, i.e. immobile. In other cases, the nodes may in fact be mobile nodes that have been relatively immobile, and have indicated such to the base station. Of course, once such a node becomes mobile, as may be determined by substantial changes in reception parameters, or other means, the node would notify the base station, which would in turn disqualify it from participation in the method.

Figure 5:
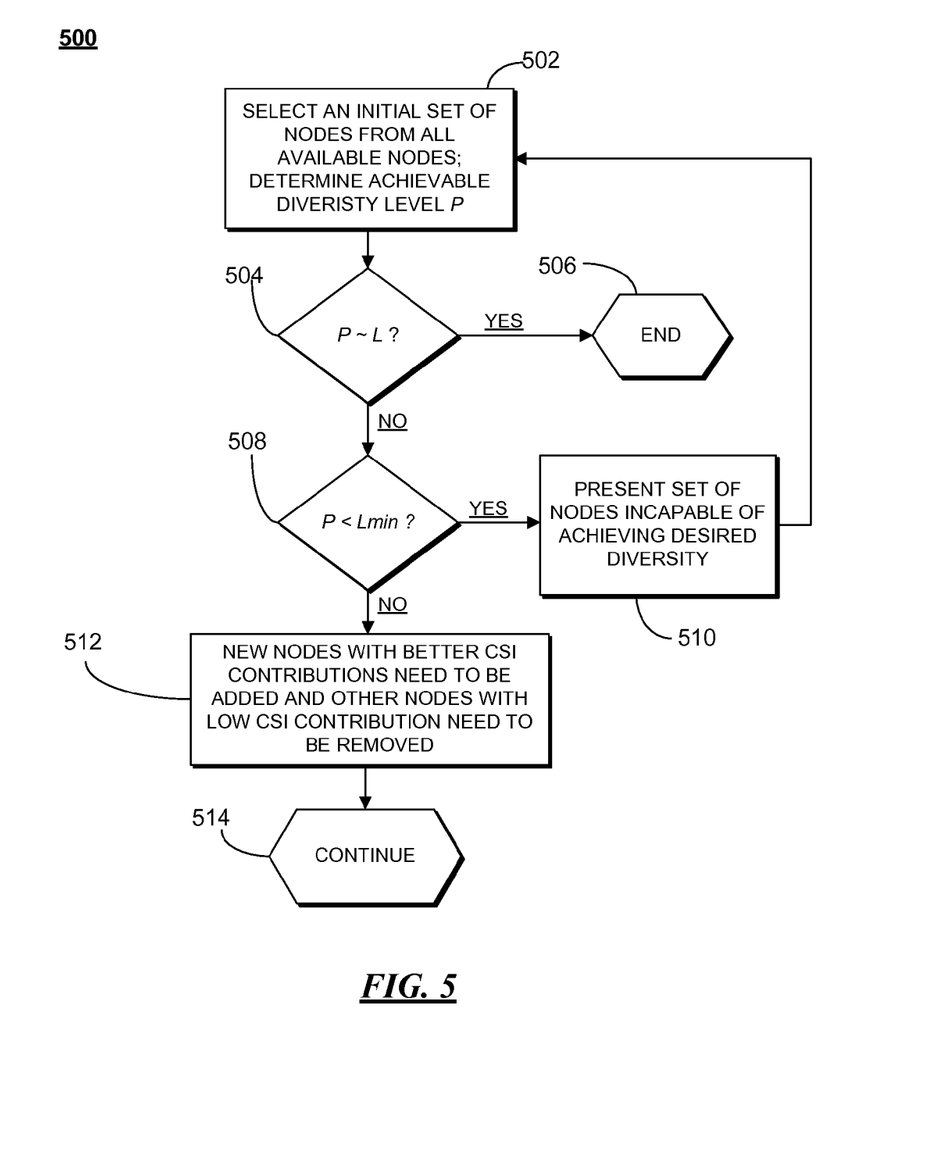
FIG. 5 shows a flow chart diagram of a method of selecting an initial set of nodes for use in cooperative sensing, in accordance with an embodiment of the invention.

FIG. 5 shows a flowchart diagram 500 of a method of selecting an initial set of nodes from a plurality of nodes associated with a base station, in accordance with an embodiment of the invention. This commences initially (502) by selecting an initial set of nodes from the plurality of nodes. The selection is performed without knowledge of the location of any nodes, and may be a random selection. Additionally, an achievable level of spatial diversity P, as indicated by the CSI of the set, is determined for the set by means of evaluating the sensing results using a randomness measure such as that expressed in equation 2. The CSI is evaluated against a desired or target level L (504). If the CSI is substantially equal to the desired level, then the method is finished (506). Otherwise, the CSI of the set is evaluated against a minimum level Lmin (508). If the CSI is below the minimum threshold, then an entirely new set must be selected (510). Once a set of nodes is found that meet the minimum threshold, but is below the desired diversity level, a determination (512) is made to continue (514) with the add and remove processes.

Figure 6:
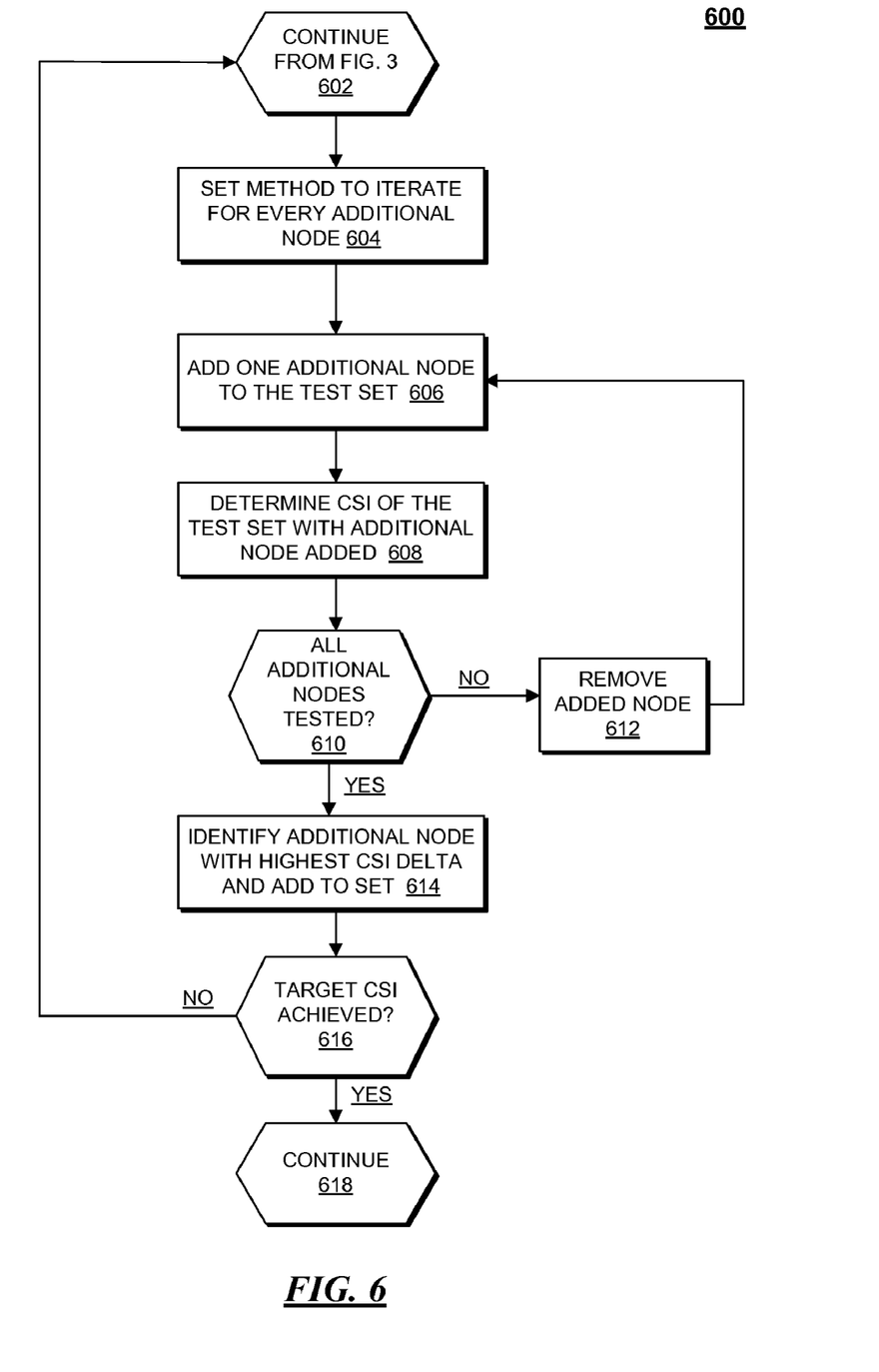
FIG. 6 shows a flow chart diagram of a method for adding a new node to the initial set of nodes to improve spatial diversity of the set of nodes, in accordance with an embodiment of the invention.

The method continues in FIG. 6, which shows a flow chart diagram 600 of a process for adding an additional node to the set. The process continues at box 602 from box 514 of FIG. 5 and commences by selecting a set of additional nodes not in the initial set. The process will be performed for each additional node under consideration (604). Each additional node is individually added into the set (606), meaning that the sensing results of the additional node are processed with the sensing results of the nodes of the initial set to determine the CSI of the aggregated sensing results (608). The resulting CSI will be incrementally higher, resulting in CSI delta which is the difference between the CSI values before and after the addition. The CSI delta is associated with the additional node and recorded. The process checks to see if all additional nodes have been evaluated (610), and if not the process is repeated (612) by removing the added node and then selecting a different node from the additional node (606). Once all additional nodes have had their individual CSI delta determined, the additional node which produced the highest CSI delta is identified and added to the set. The new, optimized or enhanced CSI is compared to the target CSI level (616). If the target CSI has not been achieved, the process is repeated (602). Once the target level has been achieved, then the process may continue (618) with removing nodes of the initial set with a low CSI contribution.

Figure 7:
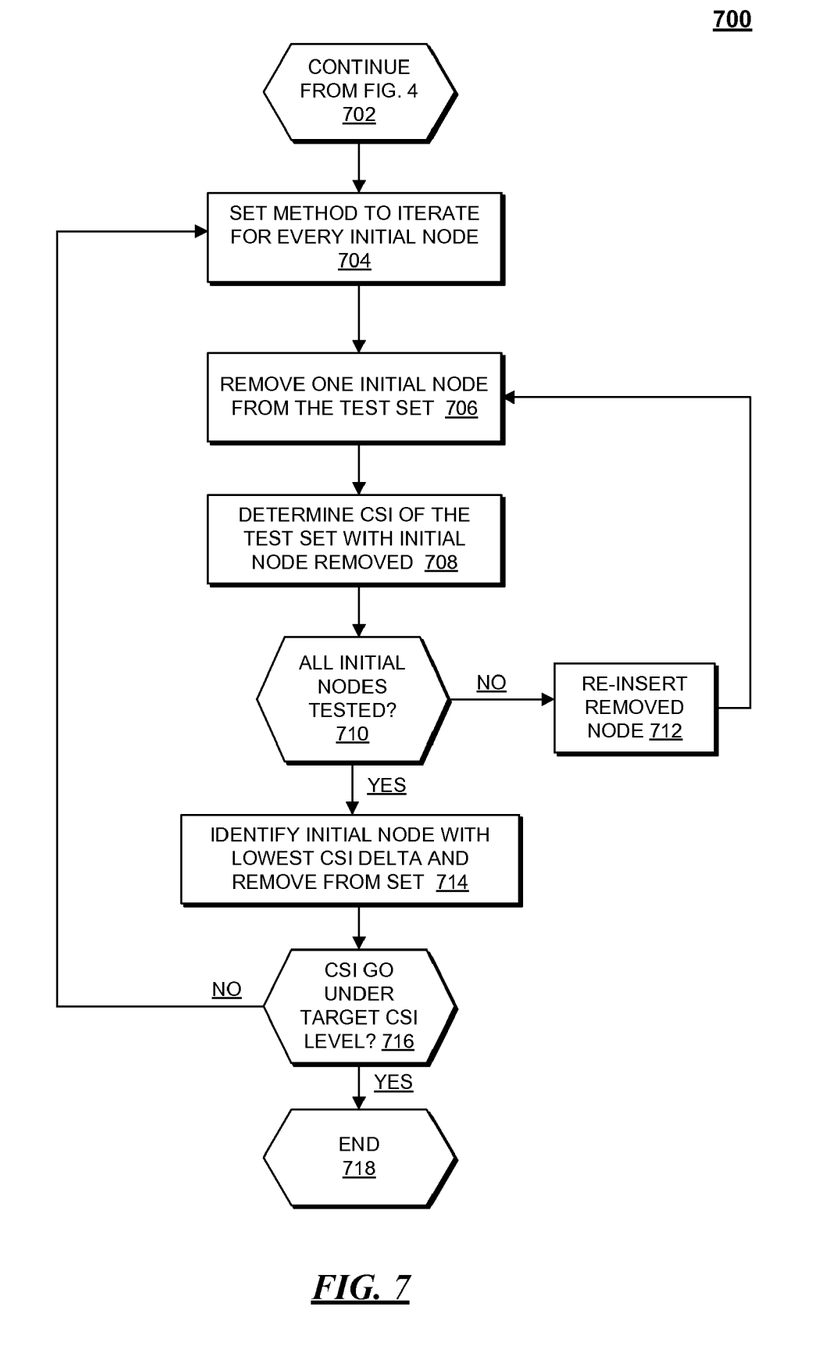
FIG. 7 shows a flow chart diagram of a method for removing a node original to the initial set of nodes to improve spatial diversity of the set of nodes, in accordance with an embodiment of the invention

FIG. 7 shows a flow chart diagram of a process 700 for removing nodes of the initial node set from the sensing set, in accordance with an embodiment of the invention. The process continues (702) the method after the process of FIG. 6 is performed. Similarly, the process is set for number of iterations equivalent to the number of nodes in the initial set (704). A first one of the initial set of nodes is then removed (706) from the set and the CSI is determined (708) without the initial node. The process checks if all of the initial nodes have been individually removed (710). That is, the CSI delta with each initial node removed, one at a time, with the other initial nodes and the additional node or nodes being evaluated together. If there are more of the initial nodes to remove, the process re-inserts the presently removed initial node into the group (712) and then repeats the CSI delta determination for the next initial node by returning to box 706. If all of the initial nodes have had their CSI contribution determined by individually removing them and determining the CSI without their sensing result in the CSI calculation, the process then identifies the initial node with the lowest delta and removes it from the set (714). The process then checks the CSI resulting from removing the initial node, with the additional node added from the process of FIG. 4 (716). If the resulting CSI has not dropped below the target CSI level, then additional nodes may be removed, and the process repeats starting at box 704. If the CSI has dropped below the target CSI level, then the process terminates and the remaining nodes are used as the sensing set. The sensing set is used by the base station to the sense candidate channels for secondary usage. Nodes that are removed from the set may be used to form sensing sets for other channels at other frequencies. These other sensing sets may perform cooperative sensing at the same time as other sets of nodes perform their respective cooperative sensing on their respective channels. It will be appreciated by those skilled in the art that the initial set of nodes can simply be two nodes randomly selected, and then the method of adding nodes is, where each added node is selected for having the most desirable CSI delta of the nodes tested. Once a certain number of nodes is reached, or if the CSI drops to a preselected level, then nodes of this initial set may be replaced to optimize the set according to the method shown in FIGS. 6 and 7.

As a result of performing the method of the invention, the sensing set will have sufficient spatial diversity to assure the cooperative sensing performed by the sensing set of nodes will identify any incumbent signals, as well as avoid false detections. Furthermore, it is contemplated that, if the desired CSI level cannot be achieved, so long as the minimum CSI threshold is met, the base station may alter transmission parameters accordingly. Accordingly, gains in spatial diversity may be realized as radio power gain.

This invention can be embodied in other forms without departing from the spirit or essential attributes thereof. Accordingly, reference should be made to the following claims, rather than to the foregoing specification, as indicating the scope of the invention.

What is claimed is:

1. A method for optimizing spatial diversity of a set of nodes for cooperative spectrum sensing, comprising:
    selecting an initial set of nodes from a plurality of nodes, the initial set of nodes selected at random from the plurality of nodes;
    obtaining sensing results from each node of the initial set of nodes, the sensing results produced by the nodes in response to performing a cooperative sensing regime;
    determining an initial cooperative sensing index of the initial set of nodes based on the sensing results, the initial cooperative sensing index indicating a level of spatial diversity of the initial set of nodes, wherein the initial cooperative sensing index satisfies a minimum spatial diversity criteria;
    selecting at least one additional node from a remaining set of nodes, the remaining set of nodes consisting of nodes in the plurality of nodes not in the initial set of nodes, wherein the at least one additional node is selected at random from the remaining nodes, wherein selecting at least one additional node is performed by determining a cooperative sensing index of the initial set of nodes when sensing results of each one of the at least one additional nodes is included individually in the determination of the cooperative sensing index, and determining which additional node increases the cooperative sensing index most over the initial cooperative sensing index; and
    replacing at least one node in the initial set of nodes with the at least one additional node to produce an optimized set of nodes, the optimized set of nodes having an increased cooperative sensing index that is higher than the initial cooperative sensing index, wherein replacing at least one node is performed by including the additional node which increased the cooperative sensing index most, and individually removing each node of the initial set of nodes and determining the cooperative sensing index with each node of the initial set of nodes removed individually, and determining which node of the initial set of nodes which, when removed, has a lowest effect on the cooperative sensing index.

2. The method of claim 1, wherein the method is performed for at least a first radio frequency and a second radio frequency, and wherein the optimized set of nodes for the first radio frequency and the optimized set of nodes for the second radio frequency are determined independent of each other.

3. The method of claim 1, wherein selecting nodes of the initial set and the remaining set are performed by selecting node that are fixed in location.

4. The method of claim 1, wherein determining the initial and optimized cooperative sensing index are performed based on sensing results provided by each node of the initial set of nodes and the at least one additional node when they are sensing a common reference signal.

5. The method of claim 1, further comprising using the optimized set of nodes to sense secondary channel availability for a secondary communication operation.

6. A method for optimizing a sensing set of nodes for use in cooperative sensing secondary channel availability, comprising:

selecting an initial set of nodes from a plurality of nodes associated with a base station to form a sensing set of nodes, the initial set of nodes having a cooperative sensing index that at least meets a minimum cooperative sensing index criteria;

selecting an additional set of nodes, the additional set of nodes consisting of at least one node from the plurality of nodes not in the initial set of nodes;

determining a cooperative sensing index delta for each one of the additional nodes when each of the additional nodes is individually added to the sensing set of nodes and identifying a leader node among the additional nodes which yields a highest cooperative sensing index delta when added to the sensing set;

adding the leader node to the sensing set of nodes;

determining a cooperative sensing index delta for each node of the initial set of nodes when individually removed from the sensing set of nodes with the leader node added to the sensing set and identifying which node of the initial set of nodes yields a lowest cooperative sensing index delta when removed from the sensing set; and removing the node of the initial set of nodes which yields the lowest cooperative sensing index delta from the sensing set;

wherein the cooperative sensing index is based on radio sensing results provided by each node of the sensing set, and wherein the sensing results are obtained by each node in the sensing set by performing a sensing regime provided by the base station to each node in the sensing set.

7. The method of claim 6, further comprising iteratively repeating the method of claim 6 until the sensing set of nodes yields a desired cooperative sensing index, and wherein selecting the initial set comprises selecting the nodes of the sensing set produced by a most recent iteration of the method.

8. The method of claim 6, wherein the method is performed for at least a first radio frequency and a second radio frequency, and wherein the sensing set of nodes for the first radio frequency and the sensing set of nodes for the second radio frequency are determined independent of each other.

9. The method of claim 6, wherein the sensing regime comprises identification of a common reference signal to be sensed by each of the nodes.

10. The method of claim 6, wherein each of the sensing nodes are fixed in location.

11. The method of claim 6, further comprising repeating the method of claim 8 upon occurrence of a predefined event.

12. The method of claim 11, wherein the predefined event is a passage of a preselected period of time.

13. The method of claim 6, wherein the initial set of nodes comprises two nodes, the method further comprises repeating selecting an additional set of nodes, determining a cooperative sensing index delta for each one of the additional nodes, and adding the leader node, increasing the number of nodes in the sensing set until a desired cooperative sensing index is reached.

* * * * *

UNITED STATES PATENT AND TRADEMARK OFFICE
CERTIFICATE OF CORRECTION

PATENT NO.        : 8,160,004 B2                                            Page 1 of 1
APPLICATION NO.   : 12/494742
DATED             : April 17, 2012
INVENTOR(S)       : Rao et al.

It is certified that error appears in the above-identified patent and that said Letters Patent is hereby corrected as shown below:

On the Title Page, Item (75), under "Inventors", in Line 3, delete "Surhir" and insert -- Sudhir --, therefor.

In Fig. 3, Sheet 3 of 7, for Tag "304", in Line 3, delete "MEASURMENTS" and insert -- MEASUREMENTS --, therefor.

In Fig. 5, Sheet 5 of 7, for Tag "502", in Line 5, delete "DIVERISTY" and insert -- DIVERSITY --, therefor.

Signed and Sealed this
Eighteenth Day of December, 2012

David J. Kappos
*Director of the United States Patent and Trademark Office*